United States Patent [19]

Donnelly

[11] 4,081,256

[45] Mar. 28, 1978

[54] ENDOTHERMIC COMPOSITION AND COLD PACK

[75] Inventor: William R. Donnelly, Piqua, Ohio

[73] Assignee: Readi Temp, Inc., Piqua, Ohio

[21] Appl. No.: 747,198

[22] Filed: Dec. 3, 1976

[51] Int. Cl.$^2$ ............................................. F25D 5/02
[52] U.S. Cl. ........................................... 62/4; 252/70
[58] Field of Search ............... 62/4; 252/70; 206/219; 128/82.1, 254, 399, 403, DIG. 27

[56] References Cited

U.S. PATENT DOCUMENTS

| | | | |
|---|---|---|---|
| 1,894,775 | 1/1933 | Levenson | 252/70 |
| 2,800,454 | 7/1957 | Shepherd | 252/70 |
| 3,058,313 | 10/1962 | Robbins | 62/4 |
| 3,191,392 | 6/1965 | Donnelly | 62/4 |
| 3,903,011 | 9/1975 | Donnelly | 252/70 |
| 3,950,158 | 4/1976 | Gossett | 62/4 |
| 3,957,472 | 5/1976 | Donnelly | 62/4 |
| 4,000,996 | 1/1977 | Jordan | 62/4 |

*Primary Examiner*—Hiram H. Bernstein
*Attorney, Agent, or Firm*—Jerome P. Bloom

[57] ABSTRACT

A particulate composition producing an endothermic reaction when mixed with water, and a cold pack containing such a composition, and water isolated therefrom until the intended time of use. The composition consists essentially of, in parts by weight, about 65 to about 130 parts urea, about 35 to about 80 parts hydrated sodium acetate (Na $C_2H_3O_2 \cdot 3H_2O$), about 18 to about 40 parts potassium chloride, potassium nitrate, or mixtures thereof, about 18 to about 30 parts ammonium chloride, and about 6 to about 10 parts quar gum. A cold pack comprises an outer sealed, flexible, impermeable enclosure containing the composition, and an inner sealed, flexible, impermeable, easily ruptured enclosure containing about 85 to about 140 parts by weight water. The pack reaches and maintains a temperature of about $-7°$ C for up to 30 minutes, and is moldable to conform to the surfaces being cooled.

5 Claims, No Drawings

ENDOTHERMIC COMPOSITION AND COLD PACK

BACKGROUND OF THE INVENTION

The present invention relates to a composition which produces an endothermic reaction when mixed with water, and to a cold pack containing such a composition, and water isolated therefrom until the intended time of use. Although not so limited, the invention has particular utility as a therapeutic cold pack, e.g. treatment of sprains, athletic injuries and the like; for chilling of beverages and packaged foods; and for other applications for cooling surfaces for a period of time up to about 30 minutes.

Compositions producing an endothermic reaction and packages or enclosures for such compositions are known in the prior art. However, a component of most of such compositions is ammonium nitrate, which is dangerous to store, and for use by the general public, in view of its explosive nature.

Moreover, to the best of applicant's knowledge, prior art packages intended for cooling do not provide a moldable mass enclosed in a flexible container which will conform to the contours of the surface being cooled.

SUMMARY

It is a principal object of this invention to provide a composition which produces an endothermic reaction when mixed with water, the composition being safe to use and non-toxic, and to provide a cold pack containing such a composition, and water needed to activate the composition, which is moldable to conform to the contours of the surfaces being cooled.

A composition in accordance with the invention consists essentially of, in parts by weight, about 65 to about 130 parts urea, about 35 to about 80 parts hydrated sodium acetate (Na $C_2$ $H_3O_2$.$3H_2O$), about 18 to about 40 parts of potassium chloride of potassium nitrate, or mixtures thereof, about 18 to about 30 parts ammonium chloride, and about 6 to about 10 parts guar gum (as hereinafter defined). This composition forms a moldable gel when mixed with about 85 to 140 parts by weight of water, which may be at ambient temperature, and will reach and maintain a temperature of about $-7°$ C ($20°$ F) for a period of time of about 30 minutes.

A cold pack in accordance with the invention comprises a sealed, flexible, impermeable, water insoluble outer enclosure having high resistance against puncture, rupture and abrasion; a sealed, flexible, impermeable, water insoluble inner enclosure having low resistance against puncture and rupture, the inner enclosure being of smaller size than the outer enclosure and being disposed therewithin; the outer enclosure containing a particulate composition which produces an endothermic reaction when mixed with water, the composition consisting essentially of, in parts by weight, about 65 to about 130 parts urea, about 35 to about 80 parts sodium acetate (Na $C_2$ $H_3O_2$.$3H_2O$), about 18 to about 40 parts of potassium chloride, potassium nitrate, or mixtures thereof, about 18 to about 30 parts ammonium chloride, and about 6 to about 10 parts guar gum; and the inner enclosure containing about 85 to about 140 parts by weight of water. Upon rupture of the inner enclosure to cause contact between the particulate composition and water, an endothermic reaction starts, a moldable gel forms, and the moldable mass gradually reaches a temperature of about $-7°$ C, which is maintained for about 30 minutes.

The components of the composition, and the relative proportions thereof, are to be considered as critical. Omission of any component, or departure from the defined proportions, results in loss of the desired properties.

DESCRIPTION OF THE PREFERRED EMBODIMENTS

A preferred composition within the broad ranges set forth above, which exhibits an optimum combination of properties, consists essentially of, in parts by weight, about 70 parts urea, about 40 parts sodium acetate (Na $C_2$ $H_3O_2$.$3H_2O$), about 20 parts potassium chloride, about 20 parts ammonium chloride, and about 8 parts guar gum. Preferably about 90 parts by weight water are added to this preferred composition to initiate the endothermic reaction.

The particle size of the components of the composition is not critical and can be the usual size of granules or crystals of the commercial grade of the various components. In the case of the hydrated form of sodium acetate (which must be used rather than anhydrous sodium acetate) the material will be in the form of monoclinic prisms. The urea can be in the form of crystals or small prills.

With respect to the cold pack of the invention, the outer enclosure will be any of a variety of resin films having the above described properties, and polyethylene or polyvinyl chloride have been found to be entirely suitable. The thickness of the film will be selected so as to resist penetration, rupture or abrasion.

The inner enclosure may also be of the same or different resin and will be of a much thinner gauge in order that it will rupture upon application of a predetermined pressure to the package.

The particulate components of the composition are introduced in admixture into the outer enclosure, no separation being needed since there is no reaction therebetween, at least in the dry state. The water which will initiate the endothermic reaction is introduced into the inner enclosure and this is sealed. The inner enclosure is then nested within the outer enclosure, and the outer enclosure is sealed. Heat sealing is effective for both enclosures in the case of a resin film such as polyethylene or polyvinyl chloride.

When it is desired to use the cold pack of the invention, pressure is applied so that the bag containing the water is ruptured, which thus starts the reaction. The water initially dissolves the potassium chloride and ammonium chloride which results in an immediate cooling effect. This is substantially completed in about 10 seconds and decreases the temperature of the entire package down to about $5°$ C (about $40°$ F).

The urea dissolves somewhat more slowly and starts to absorb the water and create a continued endothermic reaction at about the time of completion of the solution of the potassium chloride and ammonium chloride. In about another 5 seconds the solution of the urea in water is effective to reduce the temperature to about $-7°$ C (about $20°$ F).

The sodium acetate and guar gum have in the meantime started to gel, and this gel starts to thicken and expand by the time the mass reaches a temperature of about $-7°$ C. The particles of urea not yet in solution are covered and coated by the gel, so that the water, which is absorbed in the gel, slowly and progressively dissolves the coated particles of urea, thus producing a continued endothermic effect which maintains the temperature at about −7° C for a period of time up to about 30 minutes. After this, the temperature gradually starts to rise.

From the above description, it is thus evident that each of the components, and the approximate proportion thereof, is essential in initiating, continuing and prolonging the endothermic reaction. Moreover, the components interact to produce a prolonged cooling effect and to form a gel which is moldable and hence conforms to the surfaces being cooled, thereby insuring high cooling efficiency.

More specifically, potassium chloride (or potassium nitrate, or mixtures thereof) and ammonium chloride dissolve rapidly in water at ambient temperature and hence initiate the endothermic reaction within a few seconds after contact with water. However, the total amount of these components must be kept low enough to avoid creation of a saturated solution and should also be so proportioned as to be less than the urea content since the urea produces the prolonged endothermic reaction. Accordingly, a minimum of about 18 parts by weight each of potassium chloride and ammonium chloride must be present, while a maximum of about 40 parts potassium chloride and about 30 parts ammonium chloride must be observed for a urea range of about 65 to about 130 parts and about 85 to about 140 parts water.

Hydrated sodium acetate must be present in an amount sufficient to produce the desired gelling action, in combination with guar gum. Since neither contributes to the endothermic reaction substantially, the total amounts should be kept low relative to the other components. On the other hand the proportion of sodium acetate must exceed that of the guar gum because it provides the basic pH which causes gelling of the guar gum. Additionally, sodium acetate produces a gel in situ without mixing or agitation, and because of its high solubility in water still leaves sufficient "free" water to effect gradual solution of the relatively high proportion of urea. For these reasons a range of about 35 to about 80 parts by weight hydrated sodium acetate has been found to be essential.

Finally, enough water must be provided to dissolve all the compounds which produce the endothermic reaction. However, an excess of water would decrease the gelling effect, delay the reduction in temperature, and limit the lowermost temperature which could be attained. Hence a range of about 85 to about 140 parts by weight should be observed.

Guar gum is derived from the ground endosperms of Cyamopsis tetragonolobus. It contains about 35 percent galactose and about 63 percent mannose. These are aldohesosen, the D (+) forms thereof being stereoisomers of D (+) glucose. This material is available in a form wherein the galactose-mannose rings are treated with a positive charge to become a polysaccharide. in which form it is sold under the Trademark JAGUAR PLUS (by Stein-Hall Inc.) This is the preferred form used in the present invention. Reference may be made to the Merck Index, 8th Edition, page 512.

Guar gum gels in an alkaline medium. Since urea is a weak base, and since there is some hydrolysis of sodium acetate in aqueous solution (a salt of a strong base and weak acid) to produce a basic pH, the gelling effect of the guar gum is intensified. It is thus apparent that the sodium acetate is essential in the production of the gel, the gel in turn being an essential feature since it produces a flexible moldable mass which conforms to the contours of the surfaces to which the pack is applied, as well as prolonging the solution of urea and thereby continuing the cooling effect at a relatively constant level over a period of time.

While the cold pack of the invention has been described as having the particulate composition in the outer enclosure and the water sealed in the inner enclosure, it is to be understood that this could be reversed, with the dry components sealed in the inner enclosure and the water in the outer enclosure. However, the preferred arrangement is with the water in the inner enclosure, since it facilitates rupture of the inner enclosure when pressure is applied thereto and facilitates uniform and rapid contact of water with all the particulate composition.

It is not necessary that the interior of the outer enclosure be evacuated. The gelling which occurs causes an expansion of the mass, but this does not occur to such an extent as to exert undue pressure on the outer enclosure, or to compress unduly the relatively small amount of air within the sealed outer enclosure.

It is thus apparent that the composition and cold pack of the present invention accomplish the principal objectives set forth above. Various modifications may be made without departing from the spirit and scope of the invention.

I claim:

1. A composition adapted to produce an endothermic reaction over an extended period of time when mixed with water, consisting essentially of, in parts by weight, about 65 to about 130 parts urea, about 35 to about 80 parts hydrated sodium acetate (Na $C_2$ $H_3O_2$.$3H_2O$), about 18 to about 40 parts of a potassium salt selected from the group consisting of potassium chloride, potassium nitrate, and mixtures thereof, about 18 to about 30 parts ammonium chloride, and about 6 to about 10 parts guar gum, said composition forming a moldable gel upon mixing with about 85 to about 140 parts water at ambient temperature and maintaining a temperature of about −7° C (about 20° F) for a period of time up to 30 minutes.

2. The composition claimed in claim 1, consisting essentially of, in parts by weight, about 70 parts urea, about 40 parts hydrated sodium acetate (Na $C_2$ $H_3O_2$.$3H_2O$), about 20 parts potassium chloride, about 20 parts ammonium chloride, and about 8 parts guar gum.

3. A cold pack adapted to conform to the contours of a surface to which it is applied, comprising a sealed flexible, impermeable, water insoluble outer enclosure having high resistance against puncture, rupture and abrasion; a sealed flexible, impermeable, water insoluble inner enclosure having low resistance against puncture and rupture, said inner enclosure being of smaller size than said outer enclosure and being disposed therewithin; said outer enclosure containing a particulate composition adapted to produce an endothermic reaction when mixed with water, said composition consisting essentially of, in parts by weight, about 65 to about 130 parts urea, about 35 to about 80 parts hydrated sodium acetate (Na $C_2$ $H_3O_2$.$3H_2O$), about 18 to about 40 parts of a potassium salt selected from the group consisting of potassium chloride, potassium nitrate, and mixtures thereof, about 18 to about 30 parts ammonium chloride, and about 6 to about 10 parts guar gum; said inner enclosure containing about 85 to about 140 parts water, whereby rupture of said inner enclosure causes said water to contact said composition and produce an endothermic reaction and a gelling of said composition into a moldable mass.

4. The cold pack claimed in claim 3, wherein said particulate composition consists essentially of, in parts by weight, about 70 parts urea, about 40 parts hydrated sodium acetate (Na $C_2H_3O_2 \cdot 3H_2O$), about 20 parts potassium chloride, about 20 parts ammonium chloride, and about 8 parts guar gum, and wherein about 90 parts by weight water are provided in said inner enclosure.

5. The cold pack claimed in claim 3, wherein said endothermic reaction gradually reduces the temperature of said moldable mass to about $-7°$ C and maintains said temperature for a period of time up to 30 minutes.

* * * * *

UNITED STATES PATENT AND TRADEMARK OFFICE
CERTIFICATE OF CORRECTION

PATENT NO. : 4,081,256
DATED : March 28, 1978
INVENTOR(S) : William R. Donnelly

It is certified that error appears in the above-identified patent and that said Letters Patent are hereby corrected as shown below:

In the ABSTRACT, line 10, "quar" is corrected to read -- guar --.

Col. 1, line 40, "of" (second occurrence) should read -- or --.

Col. 3, line 37, "in situ" is to be underlined;

Signed and Sealed this

Twenty-second Day of August 1978

[SEAL]

Attest:

RUTH C. MASON
Attesting Officer

DONALD W. BANNER
Commissioner of Patents and Trademarks